United States Patent [19]

Gold

[11] 4,072,972
[45] Feb. 7, 1978

[54] PHOTOGRAPHIC FILM CASSETTE

[75] Inventor: Nicholas Gold, Arlington, Mass.

[73] Assignee: Polaroid Corporation, Cambridge, Mass.

[21] Appl. No.: 672,168

[22] Filed: Mar. 31, 1976

Related U.S. Application Data

[63] Continuation-in-part of Ser. No. 485,795, July 5, 1974, abandoned.

[51] Int. Cl.² ............................................. G03B 17/26
[52] U.S. Cl. ..................................... 354/275; 354/173
[58] Field of Search ................... 354/83, 86, 174, 275, 354/277, 283, 288, 210, 173; 96/76

[56] References Cited

U.S. PATENT DOCUMENTS

| 2,213,768 | 9/1940 | Merriman et al. | 242/198 |
| 2,554,349 | 5/1951 | Smith | 354/210 |
| 2,989,906 | 6/1961 | Rentschler | 354/202 |
| 3,481,261 | 12/1969 | Fischer et al. | 354/173 |
| 3,631,776 | 1/1972 | Burgarella | 354/41 X |
| 3,682,062 | 8/1972 | Erlichinran | 96/76 |
| 3,779,770 | 12/1973 | Alston et al. | 354/86 X |
| 3,953,872 | 4/1976 | Bloom et al. | 354/275 |

FOREIGN PATENT DOCUMENTS

| 175,787 | 1/1953 | Austria | 354/210 |
| 918,370 | 9/1954 | Germany. | |
| 2,330,766 | 1/1975 | Germany. | |
| 820,852 | 11/1951 | Germany | 354/210 |

Primary Examiner—Edna M. O'Connor
Attorney, Agent, or Firm—Frank J. Caufield

[57] ABSTRACT

A photographic film assemblage possessing the versatility for use with either manually operable or electrically powered photograhic camera systems. The preferred assemblage includes: a cassette with a chamber adapted to receive a plurality of film units; a battery cavity located within the chamber and adapted to optionally receive an electric storage battery, the cavity being formed by the cooperation of a platen light-seal member and a wall of the chamber; and an access aperture in the chamber through which the battery may be conveniently inserted and removed.

31 Claims, 12 Drawing Figures

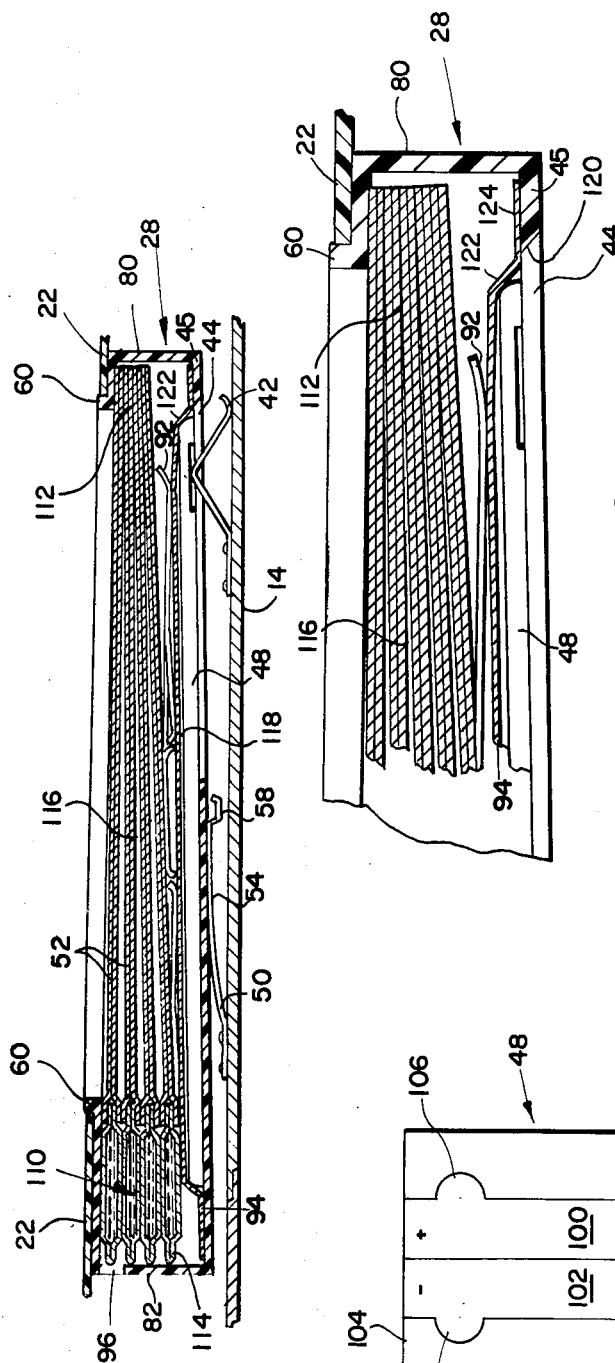
FIG. 3
FIG. 4
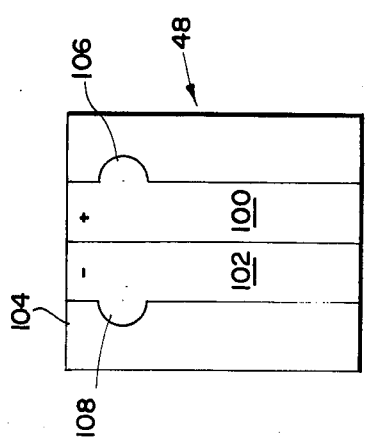
FIG. 5

PHOTOGRAPHIC FILM CASSETTE

CROSS-REFERENCE TO RELATED APPLICATION

This application is a coninuation-in-part of copending U.S. application Ser. No. 485,795, filed on July 5, 1974 by Nicholas Gold and entitled, "Photographic Film Cassette", now abandoned.

BACKGROUND OF THE INVENTION

1. Field of the Invention

This invention relates to photographic film cassettes.

2. Description of the Prior Art

Convenience, simplicity, reliability and cost are always prime considerations for potential purchasers and users of consumer products. In terms of photographic systems for amateur use, convenience may be related to the size and weight of the system; simplicity to the number of steps required of the user in the order to produce a finished photograph; reliability to the consistent performance of the system under a variety of operating conditions; and cost to the effectiveness of the system when compared to the previous three considerations. The goal for a highly cost-effective system, therefore, is to maximize convenience, simplicity and reliability while minimizing cost.

Fully automatic photographic systems that are compact, lightweight and capable of producing low-cost, finished, waste-free prints immediately after a picture is "snapped" surely meet these requirements. Such systems, however, purposely invite complexity and technical sophistication in order to satisfy these criteria. For example, a system of the self-developing type where the user effort represents the nominal steps of simply focusing and pressing an exposure-initiating button, while the system assumes the major responsibility for automatically exposing and processing the exposed self-developing film unit whereby it becomes a finished print outside of the camera, certainly represents simplicity from the user point of view. It is evident, though, that simplifying the user's task necessarily increases the system complexity because the system now has to assume the burden of those tasks normally performed by the user, and increased complexity generally implies higher system cost.

The goal of high cost-effectiveness then represents a choice to some degree between somewhat mutually inconsistent requirements. An optimized system can be achieved only by selecting the best compromise consistent with particular performance levels and design constraints imposed on the specific system.

A great many photographic systems have been developed which approach the goal of cost-effectiveness in a variety of ways. If we define the system as comprising a camera and film whose performance satisfies the consumer requirements as outlined above, we find disclosed in the patent literature what represents one of these approaches. U.S. Pat. No. 3,714,879 entitled, "Reflex Camera", issued to Edwin H. Land, et al. on Feb. 6, 1973, shows and describes a fully automatic, single-lens, reflex camera capable of being folded into a thin, compact shape suitable for convenient carrying in the pocket of a garment. This camera is intended to be used with a disposable film cassette including an integrated power supply. Such cassettes are described in considerable detail in, for example, U.S. Pat. Nos. 3,543,662 issued Dec. 1, 1970; 3,651,746, issued Mar. 28, 1972; 3,779,770, issued Dec. 18, 1973; 3,682,062, issued Aug. 8, 1972; 3,631,776, issued Jan. 4, 1972; and 3,705,542, issued Dec. 12, 1972. These patents describe photographic film assemblages, each of which basically comprises a cassette and a plurality of film units, preferably of the self-developing type, arranged in stacked relation and adapted to be exposed and then withdrawn from the cassette and processed. Also included as an integral part of the cassette is a battery or power supply for operating the components of the camera in which the film units are exposed and processed. The function of the battery is to supply the electrical power requirements to various camera subsystems whose functions correspond closely to those steps in the photographic process that would normally be performed by the system user. Such subsystems include, for example, the exposure control system, film-transport system, and a motor-powered mechanism for processing the exposed film unit. One of the foregoing U.S. Pat. Nos. 3,631,776, shows, in addition, an arrangement for connecting a thermistor in an exposure control system for purposes of changing exposure times to compensate for changes in film speed due to temperature variations. The battery additionally supplies power to logic circuits within the camera that function to control its sequential operation. In the case where the user is taking a flash picture, the battery additionally supplies the power necessary to ignite the flash bulb or could be used, alternatively, to charge a strobe unit used for artificial lighting. Batteries incorporated in such film assemblages therefore need to have a power-delivery capacity sufficient to meet the power requirements of the camera under the worst foreseeable conditions.

This would occur in the case where all pictures taken were flash pictures. Under this condition, as with others, the power would also have to be sufficient to supply the energy necessary to assure that the film would be transported through the processing system at some minimum speed which would insure proper coverage of the exposed film unit by a processing fluid contained within the film unit itself. In order to assure that these power drain requirements are fully met, these batteries have been designed to have an excess power-delivery potential even under the worst case conditions. Because of the integral nature of the cassette design incorporating both the film units and the battery within it, the cassette, once all of the film units have been used, would normally be discarded. This means that the excess of residual electrical power left in the battery would be irretrievably wasted unless some convenient means were provided in the design of the cassette which would allow the user to easily remove the battery so that its residual energy could be utilized.

Although the residual power of these batteries will depend on a variety of conditions, it is not unreasonable, based on recent experience, to expect that the battery may be recycled for use with a number of film cassettes. Since the battery represents a major portion of the cost of the film assemblage as it presently exists, it is obvious that the cost-effectiveness of a system could be dramatically improved and thereby made more attractive to the potential consumer as a result of the per-unit cost reduction that may be realized by distributing the cost of a battery over a number of film cassettes. These would be less expensive to purchase if sold individually, without a battery, but with provision for easily inserting or removing one.

In addition, such an assemblage could be purchased and used with a camera system not requiring the battery for its operation. Such a camera might be similar to the one shown and described in U.S. Pat. No. 3,757,657 entitled, "Manually Operable Film-Advancing Apparatus", issued to Vaito K. Eloranta, et al. on Sept. 11, 1973. The flexibility of having a single film cassette which may be universally used with either a manually operable or electrically powered camera system therefore seems most desirable from a cost viewpoint.

There are other advantages related to reliability and production costs. First, the reliability aspect will be considered. It will be recalled that reliability was defined as the consistent performance of the system under a variety of conditions. One condition under which a catastrophic system failure could occur would be when there was a disparity between the lives of the film and the battery. If the expected life of either the battery or the film expired, the result would be the same. In either case, the film assemblage as a whole would be useless. The present invention would prevent such a situation because the purchaser could always be assured, by comparing the expiration dates of the film and battery, that he would always be using a fresh battery with usable film. Also, the film assemblage manufacturer's inventory and production-control problems associated with matching battery and film units having the same life could be virtually eliminated, thereby reducing his costs. The cost savings could be passed on to the consumer.

Another area where costs could potentially be reduced by utilizing the present invention is related to the assemblage manufacturer's product yield. Suppose the manufacturer decided to sell both versions of the invention, both with and without the battery. In the former case, if he discovered a battery failure in the assemblage, it would be an easy task for him to simply replace the battery. Unlike the present assemblages which integrate the battery and film in a single unit, he would have to replace only the battery and would therefore not lose the film, as is presently the case. Therefore, his yield could be substantially increased while his costs proportionately reduced.

A reissued U.S. Pat., Re. No. 26,181, discloses a film spool adapted to house a battery that may be iserted into or removed from its hollowed out inner cylindrical core without exposing film that is rolled in the exterior of the core and surrounded by a cylindrical dark chamber. The present invention is structurally distinct from this, however, in that it deals with a housing arangement that incorporates both a plurality of flat film units and a flat battery in substantially parallel alignment within a single chamber that is partitioned into two separate compartments, one light sealed from the other.

U.S. Pat. No. 3,587,425 discloses a flat battery securely attached to the exterior of the flat housing having an interior chamber in which there is disposed a plurality of flat film units aligned substantially parallel to the battery. The present invention differs from this in that the battery can be easily inserted into or removed from the confines of the film chamber without exposing the film units therein.

In summary, it is believed that the present invention provides the art with an improved photographic film assemblage because it permits a user to easily insert or remove a flat battery from the assemblage so that its residual power may be reused in another similar assemblage.

SUMMARY OF THE INVENTION

The preferred embodiment depicts a photographic film assemblage, preferably of the self-developing type, adapted to optionally receive a thin rectangular laminar-celled battery. The optional feature is intended to provide the potential user with the versatility of being able to use the asemblage with either a manual operable or electrically powered camera and provide, in addition, a convenient means for retrieving residual electrical power stored in a battery after it has been used. In this latter respect, a battery may be used with several such assemblages thereby reducing the per-unit picture cost.

The invention itself, as to structure and arrangement, includes a main housing section or cassette, having a generally rectangular parallelopiped shape, which forms a chamber adapted to receive in stacked relationship the various other components of the assemblage. The chamger includes two dominant rectangular front and rear wall sections. The front wall has an exposure aperture, while the rear wall contains a battery access aperture, providing an entrance to the chamber through which the battery may be easily inserted or removed. One of the base walls, the leading wall, contains an elongated exit slot adapted to allow the passage of a film unit therethrough while also including an appropriate exit slot light seal means.

The other components of the assemblage, in order of their arrangement from the front to rear wall, are: a dark slide which provides a temporary light seal over the exposure aperture, a plurality of self-developing film units, a frame-like spring upon which the film units rest and are continuously urged thereby toward the exposure aperture, and a platen member having lateral sides that rest on the edges of the rear wall and a medial section which, in cooperation with the rear wall, defines a battery receiving cavity. The platen member additionally provides a light seal which isolates the film units from exposure by ambient light entering the battery access aperture.

OBJECTS OF THE INVENTION

An object of this invention is to provide an improved photographic film cassette, having convenient means therein for easily inserting or removing a power supply therefrom.

Another object of this invention is to provide a photographic film cassette, which may be utilized with a camera system that is either manually operable or electrically powered.

Another object of this invention is to provide a photographic film cassette which increases system effectiveness and reliability.

Yet another object of this invention is to provide a photographic film cassette which provides the capability of being able to utilize residual battery power.

Another object of this invention is to provide a photographic film cassette which alleviates inventory and production control problems associated with its manufacture.

An additional object of this invention is to provide a photographic film cassette which increases the cost effectiveness of the photographic system.

Other objects of the invention will be in part obvious and will in part be apparent hereinafter.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description when read in connection with the accompanying drawings, wherein like numbers have been employed in the different figures to denote the same parts and wherein:

FIG. 3 is a vertical section of the film assemblage, with partially included broken sections of the camera illustrated in FIG. 1;

FIG. 4 is a partially broken-away, vertical section of the film assemblage illustrated in FIG. 3 showing in greater detail the relationship between the components of the assemblage near its trailing end;

FIG. 5 is a plan view of a battery intended for the use with the assemblage, illustrating its contact features;

DESCRIPTION OF THE PREFERRED EMBODIMENT

Although the present invention has the flexibility of being used in manually operable or electrically powered cameras, it is depicted in its preferred embodiment as being incorporated in a compact, collapsible camera of the type which uses self-developing film. The camera chosen to illustrate the cooperation between the preferred embodiment of the invention and the relevant features of the camera with which it interacts generally conforms to the camera structure disclosed and described in considerable detail in U.S. Pat. No. 3,714,879 entitled, "Reflex Camera" by Edwin H. Land, et al., issued on Feb. 6, 1973. This patent shows and describes a fully automatic single-lens reflex camera, capable of being folded into a thin compact shape suitable for convenient carrying in the pocket of a garment and has the capability of automatically exposing and processing film units of the self-developing type.

Figure 1:
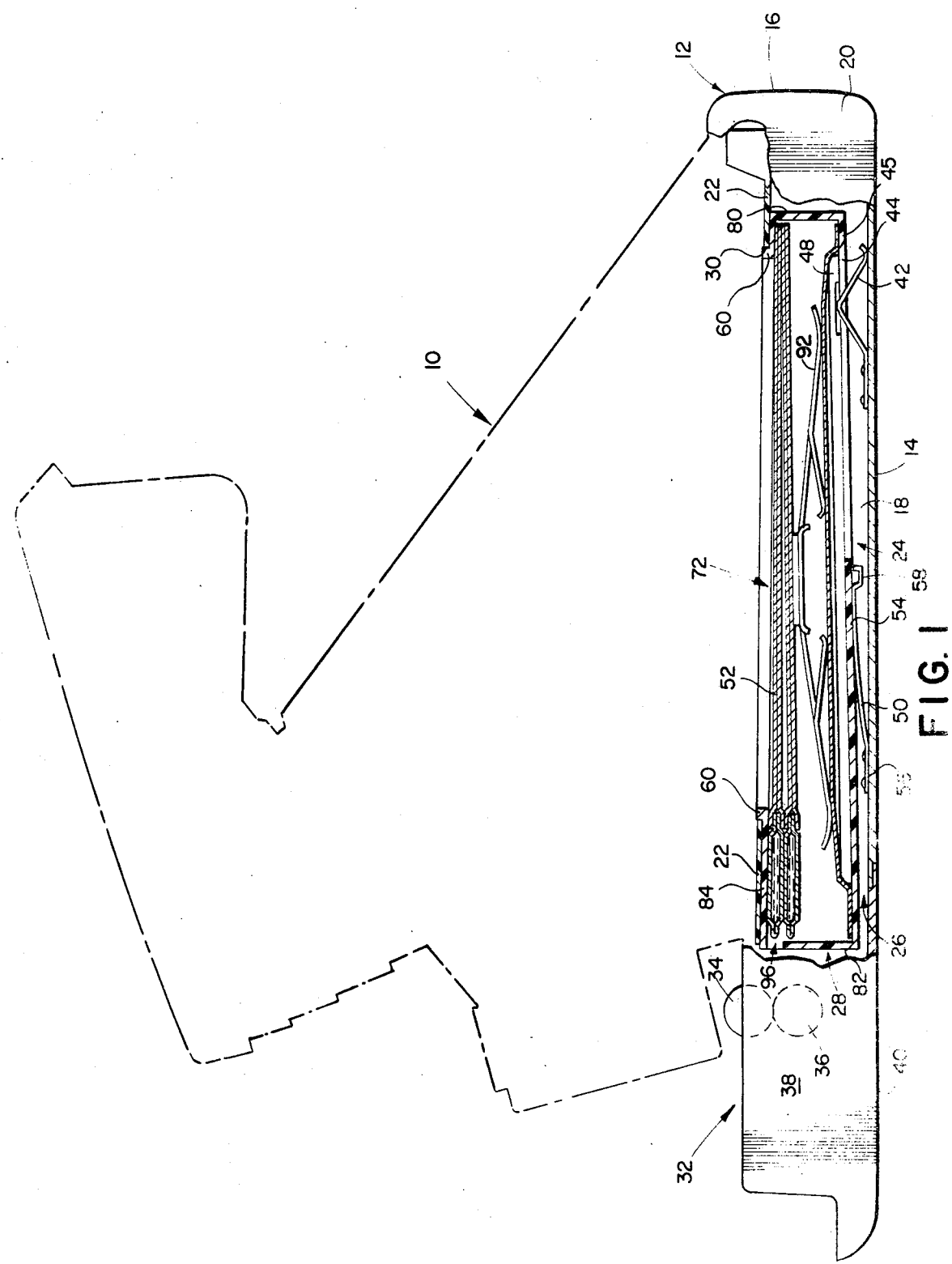
FIG. 1 is an elevational view, partly in section of a camera adapted for use with the instant invention, most sections of the camera being shown in phantom for purposes of clarity.

Referring now to FIG. 1, it will be seen that that camera 10 includes a main housing section 12 having a base wall 14, an end wall 16 and side walls 18 and 20. Walls 14, 16, 18 and 20 cooperate with plate 22 to define a chamber 24 having an open end 26, through which a film cassette 28 is adapted to be inserted. Plate 22 has a rectangular-shaped exposure opening 30 therein.

Mounted adjacent to the open end 26 of chamber 24 is a roller housing section 32, having suitable means for mounting a pair of rollers 34 and 36 between side walls 38 (only one of which is shown) and above a rear wall 40. By virtue of a pivotal coupling between housing section 32 and housing section 12, rollers 34 and 36 may be moved between a film processing position and a cassette loading position. In the processing position, which is shown in FIG. 1, rollers 34 and 36 are located to receive between them an exposed film unit as it exits from film cassette 28. The loading position is achieved by rotatably displacing housing section 32 relative to housing section 12 (counter-clockwise in FIG. 1), such that rollers 34 and 36 unblock open end 26 of chamber 24 so that film cassette 28 may be inserted into or withdrawn from the chamber 24 by way of the unobstructed path thus provided.

Mounted within chamber 24 and upon base wall 14 is a pair of laterally-spaced electrical contacts 42 (only one of which is shown), each of which is adapted to enter through a battery access aperture 44 in a rear wall 45 of film cassette 28 in order to make electrical contact with a battery 48 which provides the electrical energy necessary to power various components of camera 10 wherein the film is exposed and processed.

Also mounted within chamber 24 on base wall 14 is a support member 50, which is adapted to provide a biasing force which continuously urges a properly inserted film cassette toward plate 22 and, additionally, functions as a means for preventing the improper insertion of a film cassette in an inverted manner. Support member 50, in order to perform its functions as outlined, possesses certain structural and material characteristics which, in cooperation with the geometry of cassette 28, locate cassette 28 within chamber 24 such that a forwardmost film unit 52 is disposed in alignment with rectangular opening 30 for purposes of exposure. Accordingly, it is a resilient cantilevered member formed of a suitable flexible material such as spring steel and includes a root section 56 rigidly mounted to base wall 14, a cam surface section 54, and a generally U-shaped trap section 58 located at the end of section 54. Section 54 extends into chamber 24 away from base wall 14 toward plate 22 and longitudinally toward end wall 16, such that it is in a position to contact the surface of the rear wall 45 of cassette 28 as the cassette is inserted into chamber 24.

It can be seen that the cassette 28 has a shallow depth which includes a slight taper from its leading wall 82 to its trailing wall 80. This taper, which is approximately two and one half degrees, is formed as a result of leading wall 82 being slightly higher than trailing wall 80 and rear wall 45 being slightly non-parallel with front wall 84. As a result of the shape of cassette 28, a wedging interaction between it and the member 50 occurs whereby the progressive movement of cassette 28 toward end wall 16 of chamber 24 causes increasing displacement of member 50 toward base wall 14. The result of this displacement is an increase in force at the point of contact between cam surface section 54 and the surface of rear wall 45 of the cassette. This force is thus continuously present and always urges cassette 28 toward plate 22. Located in the front wall 84 of cassette 28 is an endless rib or flange 60 extending upwardly therefrom to define a rectangularly shaped light-transmitting section or exposure aperture 72 therein. Opening 30 in plate 22 has a complementary rectangularly shaped geometry.

In the event a cassette is inserted into chamber 24 in an inverted manner, i.e. with flange 60 facing base wall 14, section 58 of member 50 traps flange 60 such that further motion of the cassette into chamber 24 is prevented.

Figure 2:
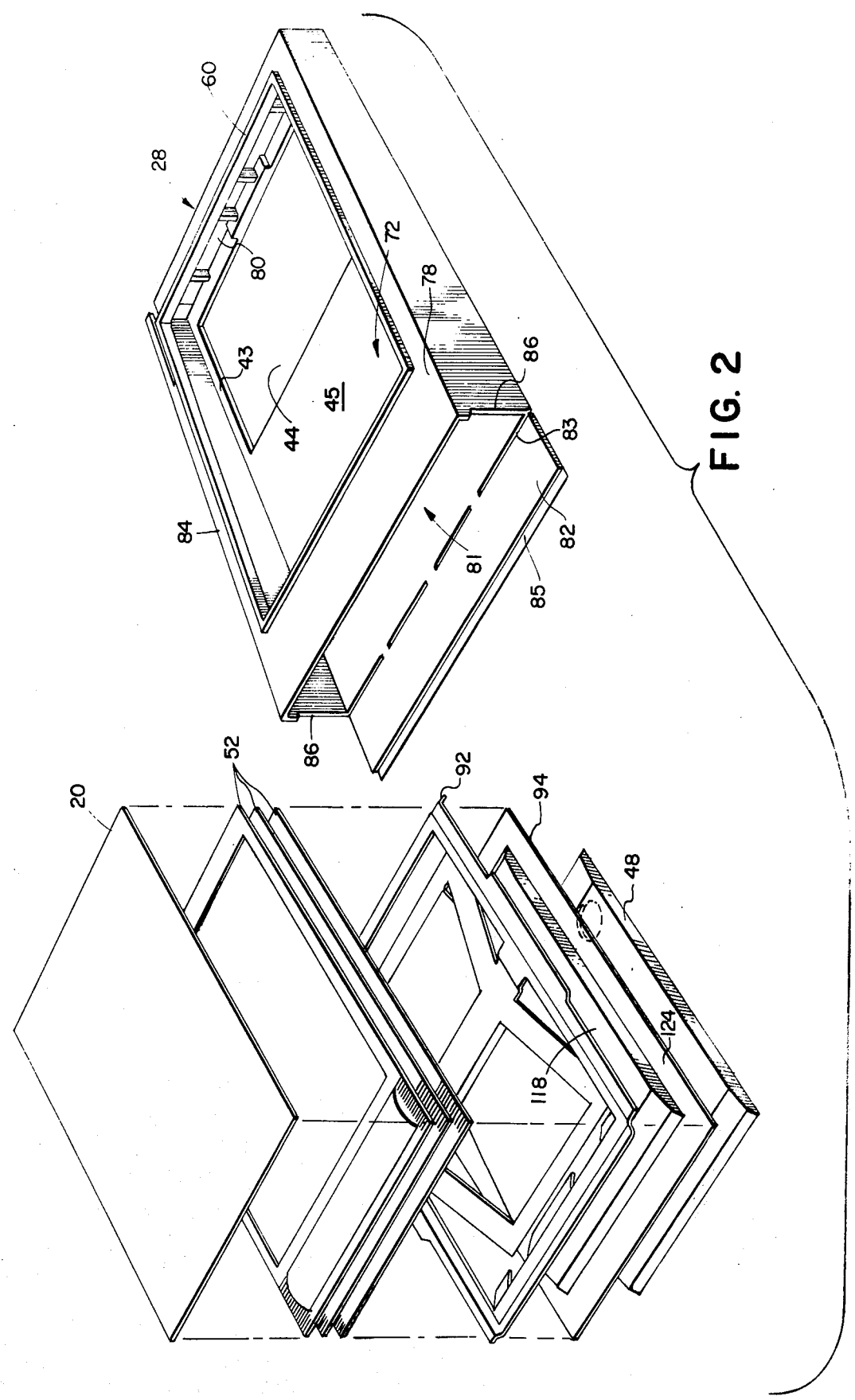
FIG. 2 is an exploded diagrammatic perspective view of the film assemblage employed in the camera illustrated in FIG. 1.

Reference is now made to FIG. 2, where the film assemblage is illustrated in further detail. It can be seen that cassette 28 includes a housing member 78 whose geometry is substantially that of a rectangular parallelopipe. Member 78 is formed of a pair of side walls 86, trailing wall 80, front wall 84, rear wall 45 and leading wall 82 shown in a folded-down position. The internal surfaces of these walls define a chamber 81 adapted to receive in stacked relationship the other components of the assemblage.

In rear wall 45 is a rectangular battery access aperture 44, through which the battery 48 may be inserted or removed. Arranged in stacked relationship and having dimensions compatible with insertion into chamber 81, the other components of the film assemblage in order of their front to rear wall sequence are: a dark slide 90 which functions to provide a light seal for exposure aperture 72, a plurality of self-developing film units 52 arranged in parallel relationship, a frame-like spring member 92 which functions to urge the film units 52 toward exposure aperture 72, a platen-like member 94 whose functions will be elaborated on later, and the battery 48 whose inclusion is optional. These components form a sandwich which is inserted into chamber 81. After their insertion into chamber 81, leading wall 82 is folded from its position as shown in FIG. 2 to its position shown in cross-section in FIG. 3 to define a film exit slot 96 through which an exposed film unit may be advanced by appropriate means.

In order to be able to fold leading wall 82, it is provided with a weakened thin lateral edge 83 which functions as a hinge. In addition, it further includes an upper hinged section 85 that is displaceably mounted with respect to a film exit slot 96 to temporarily provide a light seal across the film exit slot 96 until it is moved out of that position when it contacts the structure of camera 10 during insertion of the cassette as described in detail in U.S. Pat. No. 3,748,984.

The spatial relationships between the various assembled components of the film assemblage are illustrated in the cross-sectional view of FIG. 3. An examination of these relationships along with the design considerations imposed on the cassette configuration will indicate that reasons that determined the size and location of the battery access aperture 44. It will be recalled that an object of the present invention was to provide a film assemblage for universal use with compact cameras, having either manually operable or electrically powered subsystems. This consideration implies a minimum size chamber 81 that would house a maximum number of film units and the other components necessary to maintain the functional operability of the cassette. Or, to put it another way, the level of film units stored in the present packaging should not be reduced and its external configuration should remain compatible for use with present camera systems. In addition, it had to be configured so that the battery 48 would not be damaged as it was inserted and removed from a number of cassettes. Reference to FIG. 5 shows that battery 48 is a thin rectangular battery having a laminar cell construction. Its electrical positive and negative terminals, 100 and 102 respectively, are electrically insulated from surface contact by an appropriate non-conducting foil wrapper 104 except for circular contact areas 106 and 108, which are positioned on the botton surface so that when inserted in cassette 28 they are properly aligned with electrical contacts 42 of camera 10. The foil wrapper 104 also functions as a vapor barrier which tends to protect the film units from any photographically active gases which may eminate from the battery. Since the battery possessed this construction and characteristics it was important to protect its integrity, by providing an access aperture that would result in not bending the battery during insertion and removal.

Finally, it is evident that the cassette had to remain light tight when being used in either its battery or non-battery mode.

Referring back to FIG. 3 now and examining the nature of film units 52 near their opposite ends 110 and 112 adjacent leading wall 82 and trailing wall 80 respectively, it will become apparent why all of the considerations outlined above dictated battery access aperture 44 in rear wall 45. Ends 110 and 112 simply occupy a fixed minimum amount of space; end 110 because it contains, collectively, a stacked plurality of pressure ruptureable fluid containers 114 the contents of which is not released until after the film unit is exposed and exits cassette 28, and end 112 because the stacked flim units are incompressible at that location. The medial portions 116 of film units 52, however, allow for some compressibility because of internal air spaces separating the individual flim units. Therefore, no space was available to place the battery access aperture in end wall 80 but some internal space could be gained in the region of the medial portion 116 by compressing the film units there. This was achieved by designing platen 94 with a concave medial section 118 to perform this function while at the same time having it isolate the film units from light entering battery access aperture 44. Thus platen 94, in cooperation with real wall 45, forms a cavity inside the cavity 81 into which a battery can be placed. In other words, the platen 94 divides or partitions the cavity 81 into two compartments or sections, one for receiving the film units and the other for receiving the battery, the latter being light sealed from the former. In this respect the platen 94 may be considered to be a wall in a housing structure which includes a plurality of wall sections. The sizing and positioning of its medial concave section 118 is also compatible with the dimensions of battery 48 so that, when the battery 48 is located within cassette 28, its contact areas 106 and 108 are in alignment with electrical contacts 42 of camera 10. In this connection, it is desirable to fabricate the medial concave section 118 as a smooth continuous section on both of its surfaces in order to facilitate the insertion and removal of both the battery 48 and the other components of the assemblage.

One other feature of the design of platen 94 and access aperture 44 should be pointed out. Looking at FIG. 4, it will be seen that the lateral side 120 of aperture 44 is beveled at an angle matching that of angled section 122 which connects the lateral edges 124 of platen 94 with its concave protrusion forming concave section 118 and is spaced slightly forward of and out of line with angled section 122. This arrangement provides a low incidence angular wall that functions to prevent the cassette from hanging up on support member 50 as cassette 28 is withdrawn from chamber 24. Also, the lateral edges 124 of platen 94 continuously contact the lateral edges of rear wall 45 and butt against all the other internal walls of chamber 81 to provide the necessary light seal function. This is so because the frame-like spring member 92 continuously urges the platen 94 against the rear wall 45.

ALTERNATIVE EMBODIMENTS

Each alternative embodiment to be described, satisfying the objects of the invention and teaching how to construct a photographic film assemblage that may optionally include an electric storage battery, represents a compromise on the amount of film units that each can hold when compared to the film storage capability of the preferred embodiment, given the common requirement that the exteriors of all embodiments would have to occupy the same amount of space in a camera with the battery present.

However, the skilled artisan may not necessarily find this detrimental since the alternative embodiments present him with other arrangements for practicing the invention which he may find more suitable for his particular application and, as well, suggest a choice in manufacturing methods.

The first alternative embodiment to be described eliminates the need for the platen member by providing a means for attaching the battery to the exterior of the film storage chamber; the second and third represent different platen configurations with the battery access aperture placed in the trailing wall 80, and the remaining two, the fourth and fifth, depict embodiments that may be fabricated by injection molding.

FIRST ALTERNATIVE

Figure 6:
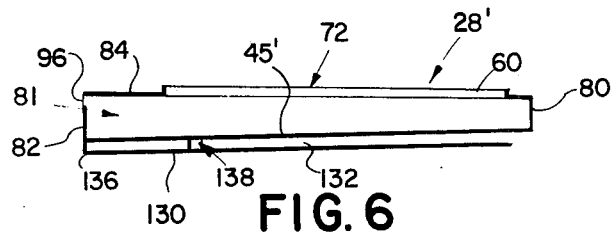
FIG. 6 is a vertical section of an alternative embodiment of the invention.
Figure 7:
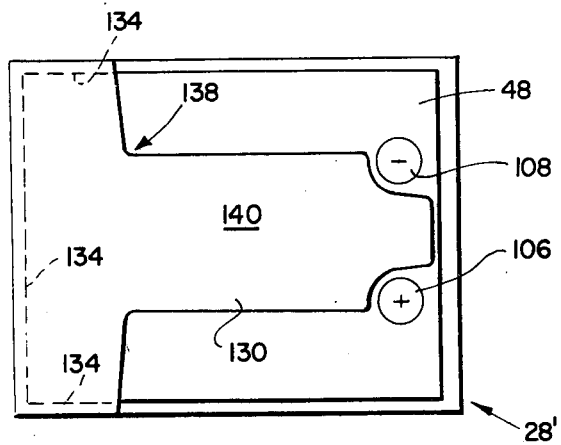
FIG. 7 is a bottom view of the embodiment of FIG. 6.

The first alternative embodiment of the invention, having the same functional characteristics but using a different approach to the battery insertion/removal aspect is illustrated in FIG. 6 and 7. The fundamental difference in this embodiment resides in the fact that the battery is attached external to chamber 81 with no access aperture in rear wall 45, thereby obviating the need for the platen 94. Instead the rear wall, now 45', is solid, thus providing the light seal function previously performed by the platen. A battery support member 130 is preferably molded integrally with the cassette, extending from a lateral edge 136 and toward trailing wall 80 for resiliently urging the battery 48 against the real wall 43.

Support member 130 and rear wall 45' thus cooperate to form a cavity or pocket 132 into which battery 48 may be inserted or removed. The planar view of support member 130 is shown in FIG. 7. There it is seen that it has lateral edges 134 which serve to form a rear pocket section 138 that locates battery 48 and prevents it from any lateral motion. Also, it includes a longitudinally extending section 140 that provides a bearing surface upon which support member 50 may ride.

SECOND AND THIRD EMBODIMENTS

Figure 8:
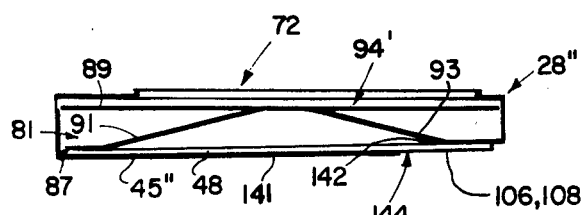
FIG. 8 is a vertical section of yet another embodiment of the invention.
Figure 9:
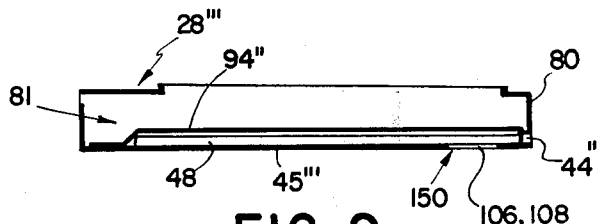
FIG. 9 is a vertical section of yet another alternative embodiment of the invention

FIGS. 8 and 9 represent yet other embodiments of the invention which, to some extend, compromise on the requirement of maintaining a certain level of film units within chamber 81. Each represents a variation in the placement of the battery access aperture and a differently configured platen member 94.

In FIG. 8, rear wall 45" is composed of spaced apart planar wall sections 141 and 142 that are offset with respect to one another to provide a gap or aperture through which the battery 48 may be inserted or removed. With this configuration, platen member 94' becomes a more complex part which now must become tri-functional, i.e., to perform the task of a light seal, a means for resiliently urging the film units toward exposure aperture 72, and a means for providing an internal stop 87 which locates battery 48 so that it is properly aligned with electrical contacts 42 of camera 10.

In these respects, platen 94' comprises an upper solid opaque platform section 89 whose lateral edges slidably contact the internal walls of chamber 81 to provide the light seal function, a resilient section 91 with one end connected to the interior of wall section 140 to form stop 87 and whose other end 93 is free to slide on wall section 142, thereby allowing platen 94' to displace as it urges the film units toward front wall 84.

FIG. 9 shows battery access aperture 44" located in the trailing wall 80 and rear wall 45"' having battery contact apertures 150. The platen member, now 94", (shown in cross-section) is redesigned to accommodate this arrangement. The primary drawback of this configuration is in its loss of usable film storage space adjacent trailing wall 80. However, either of these embodiments are viable alternatives and may even be preferable, given a differently configured film unit.

FOURTH ALTERNATIVE

Figure 10:
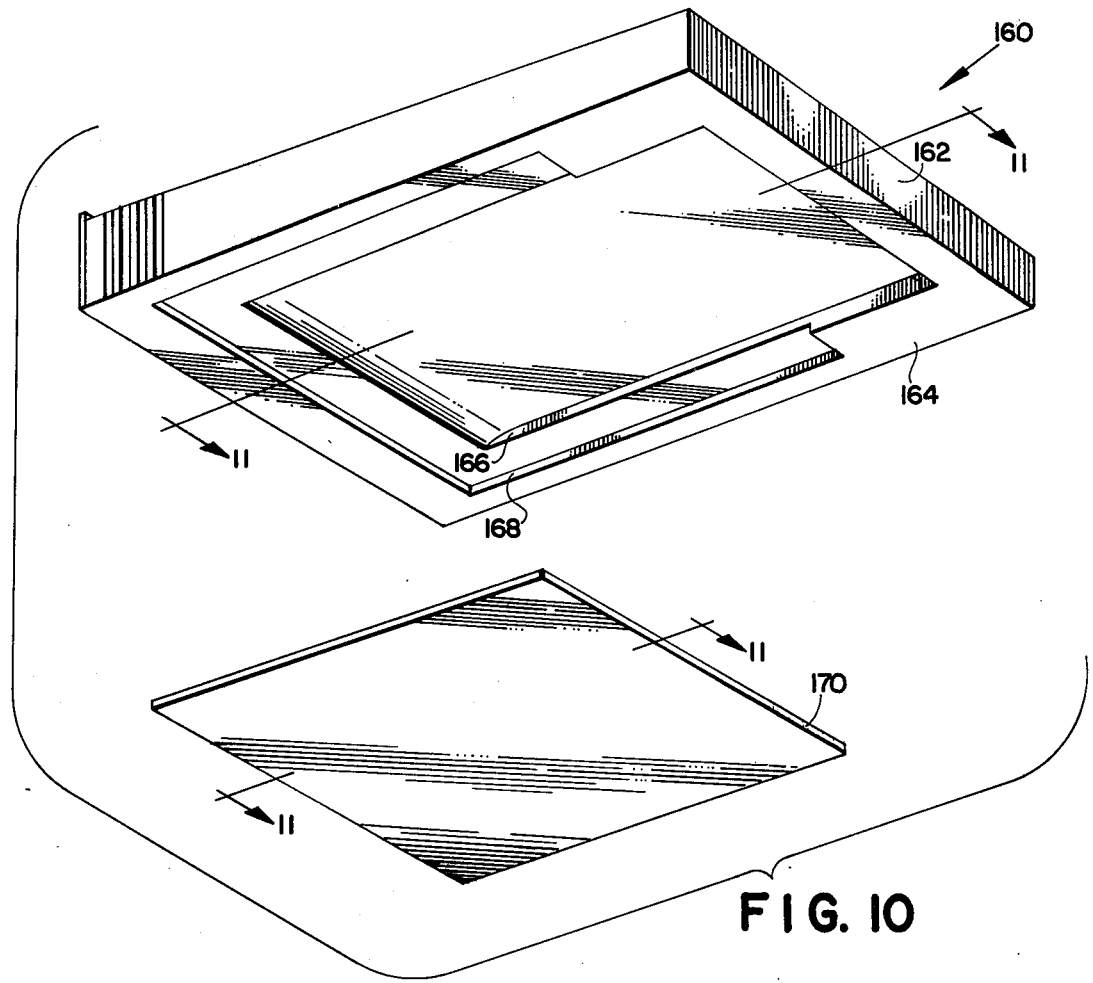
FIG. 10 is an exploded diagrammatic perspective of still another embodiment of the invention.
Figure 11:
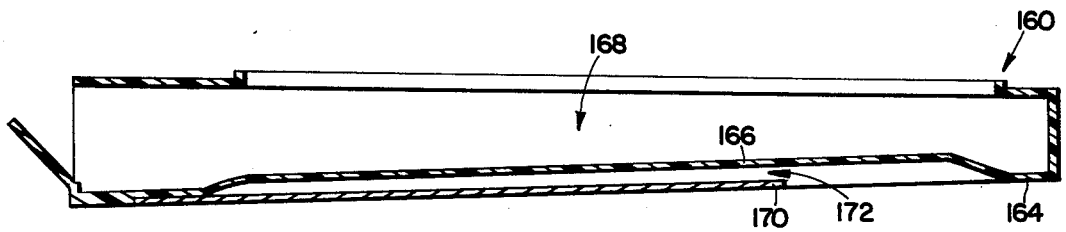
FIG. 11 is an altered vertical section of the embodiment shown in FIG. 10 with its leading wall folded down, the altered section being taken along line 11—11 of FIG. 10.

FIGS. 10 and 11 depict a film cassette 160 which, with the exception of its rear wall, is in all other respects identical to the cassette 28. It can be seen in FIG. 10 that the cassette 160 includes an internally molded plastic housing member 162, having a unitary construction. The housing member 162 includes a rear wall section 164, having molded therein a depressed cavity 166 that protrudes into its film storage chamber 168 (FIG. 11). Partially surrounding the peripheral edges of the cavity 166 is a depressed step 168 that is configured to receive a plate-like wall section member 170, preferably made of plastic. The plate 170 is placed in the depressed step 168 and secured therein by either ultrasonic welding, gluing, or heat staking. Once in place, the member 170 in cooperation with the rear wall section 164 forms a battery receiving cavity 172 into which the battery 48 may be easily inserted or removed. The edge of the member 170 is spaced from a portion of the rear wall section 164 a sufficient distance so as to expose the terminals, 106 and 108, of the battery when the battery has been fully inserted into the cavity 172.

FIFTH ALTERNATIVE

Figure 12:
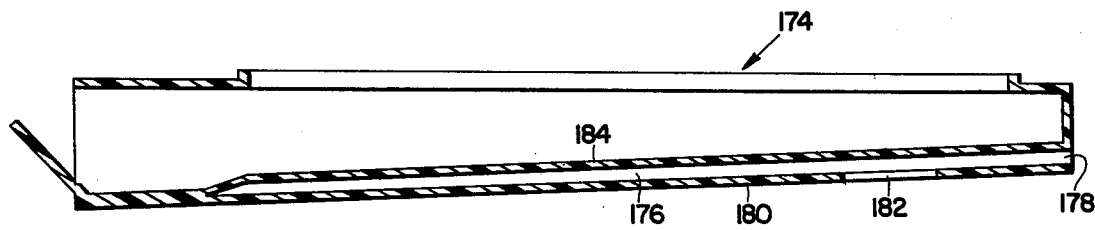
FIG. 12 is a view similar to that of FIG. 11 of yet another alternative embodiment of the invention.

FIG. 12 shows an elevated section of the final alternative. What is depicted is an opaque housing 174 that may be injection molded of plastic material in a single part. The housing 174 has a battery receiving cavity 174, into which the battery may be inserted through an aperture 178 formed in its trailing wall. In an outer wall 180, which in part defines the battery cavity 176, is molded a pair of spaced apart access holes 182 (only one shown), through which the battery contacts 42 may extend to engage the battery terminals 106 and 108. Another wall 184 that forms the cavity 176 protects the film from being exposed to ambient light since the plastic is opaque.

In discussing the preferred embodiments, the difference between the preferred embodiment and the alternatives were emphasized. It is to be understood that any essential light sealing feature or the like could easily be incorporated into any of the alternative embodiments by one skilled in the art.

This invention may be practiced or embodied in still other ways without departing from the spirit or essential character thereof. The embodiments described herein are therefore illustrative and not restrictive, the scope of the invention being indicated by the appended claims and all variations which come within the meaning of the claims are intended to be embraced therein.

What is claimed is:

1. Photographic film apparatus comprising:

opaque means for defining a film chamber of substantially shallow depth, said chamber defining means including a first wall having a light transmitting section and a second wall spaced from said first wall by a distance establishing said shallow depth;

a plurality of substantially flat unexposed film units disposed in a stacked array within said chamber and stacked depthwise of said chamber in alignment with said light transmitting section to facilitate the sequential exposure of said film units to actinic radiation entering said chamber through said light transmitting section, said chamber defining means further including means for defining an opening through which said film units may be sequentially advanced from said chamber following their exposure;

means for at least initially light sealing said opening, said opening light sealing means being displaceably mounted with respect to said opening to facilitate the advancement of said film units from said chamber through said opening;

displaceably mounted means for at least initially light sealing said light transmitting section, said chamber defining means, said opening light sealing means and said light transmitting section light sealing means being arranged to initially in combination preclude actinic radiation from impinging upon said stacked array of unexposed film units disposed within said chamber;

a substantially flat battery having a thickness substantially less than the shortest distance between said first and second walls, said battery including a pair of terminals on one of its two major surfaces; and means for positioning said battery on the opposite side of said second wall from said stacked array of film units with the other of its said two major surfaces facing said second wall, the dimensions of said flat battery being selected so that no portion of its said major surfaces extend beyond the periphery of said second wall, said positioning means being structured and arranged to expose said battery terminals exteriorly of said apparatus when said battery is located on the opposite side of said second wall from said stacked array of film units by said positioning means and further structured and arranged to facilitate the ready manual replacement of said flat battery from said apparatus with another similar flat battery.

2. Photographic film apparatus comprising:

opaque means for defining a film chamber of substantially shallow depth, said chamber defining means including a first wall having a light transmitting section and a second wall spaced from said first wall by a distance establishing said shallow depth;

a plurality of substantially flat unexposed film units disposed in a stacked array within said chamber and stacked depthwise of said shallow chamber in alignment with said light transmitting section to facilitate the sequential exposure of said film units to actinic radiation entering said chamber through said light transmitting section, said chamber defining means further including means for defining an opening through which said film units may be sequentially advanced from said chamber following their exposure;

means for at least initially light sealing said opening, said opening light sealing means being displaceably mounted with respect to said opening to facilitate the advancement of said film units from said chamber through said opening;

displaceably mounted means for at least initially light sealing said light transmitting section, said chamber defining means, said opening light sealing means and said light transmitting section light sealing means being arranged to initially in combination preclude actinic radiation from impinging upon said stacked array of unexposed film units disposed within said chamber; and means for positioning a flat battery having a thickness substantially less than the shortest distance between said first and second wall and having two major surfaces each of which major surface is dimensioned to be disposed within the confines of the peripheral dimensions of said second wall and one of which major surfaces includes a pair of terminals, on the opposite side of said second wall from said stacked array of film units with the other of the battery's two major surfaces facing said second wall, said positioning means being structured and arranged to expose said battery terminals exteriorly of said apparatus when said battery is located on the opposite side of said second wall from said stacked array of film units by said positioning means and further structured and arranged to facilitate the ready manual replacement of the flat battery with another similar flat battery.

3. The apparatus of claim 2 wherein said chamber defining means and said positioning means are formed of an integrally molded plastic structure.

4. The apparatus of claim 3 wherein said positioning means includes means for cooperating with said second wall for defining a relatively thin battery receiving chamber disposed on the opposite side of said second wall from said first wall and having an elongated open end at the opposite side of said apparatus from said chamber opening through which the flat battery may be removably inserted into said battery receiving chamber and means for providing at least one terminal opening through which the terminals of the flat battery are exposed when the flat battery has been fully inserted into said battery receiving chamber.

5. The apparatus of claim 2 wherein said chamber defining means are formed of an integrally molded plastic structure, said second wall is structured to provide a concavity and said positioning means includes a member having one end thereof coupled to said second wall and which extends in spaced apart relationship to the portion of said second wall defining said concavity to form therewith a receiving chamber for the flat battery, the other end of said member cooperating with a portion of said second wall to define an opening through which the flat battery may be removably inserted into said battery receiving chamber, said battery insertion opening being further configured such that the terminals of the battery are exposed therethrough when the flat battery is fully inserted into said battery receiving chamber.

6. The apparatus of claim 2 wherein said positioning means further comprise a substantially planar rear wall section having an opening therein and positioned on the side of said second wall opposite from said stacked array of film units to be substantially parallel therewith, said second wall and said rear wall defining a cavity into which the flat battery may be selectively inserted and removed through said rear wall opening such that when the battery is disposed in said cavity its terminals are also disposed within the limits of said rear wall opening and are accessible for electrical connection from the exterior of said apparatus, said second wall being displaceably mounted with respect to said rear wall.

7. The apparatus of claim 2 wherein said battery positioning means comprises means for selectively releasably urging the battery against an exterior surface of said second wall, said urging means being configured to position the battery substantially parallel to each said film unit and in alignment with said stacked array of film units when the battery is disposed within said positioning means so that its terminals are accessible for electrical connection.

8. The apparatus as defined in claim 2 wherein said positioning means comprises a pair of offset wall portions extending toward each other from opposite ends of said chamber such that the free ends of said offset wall portions form an opening through which the battery may be moved to locate it between said second wall and one of said offset wall portions.

9. The apparatus as defined in claim 2 wherein said positioning means includes a rear wall spaced from said second wall so as to define an open ended chamber through which the battery may be inserted into or removed from said battery chamber, said rear wall further including means defining at least one aperture through which the terminals of the battery may be engaged, said apparatus further including means for resiliently biasing said second wall toward said rear wall.

10. A photographic film assemblage comprising:
a substantially flat housing including means for defining a flat chamber and a second chamber separated from said first chamber by an opaque wall, each said chamber being relatively thin and one of said chambers extending adjacent at least a section of said other chamber so that the depth of both said chambers in combination substantially defines the depth of said substantially flat housing where said chambers extend adjacent one another;
a plurality of substantially flat unexposed film units disposed in a stacked array within said first chamber, said unexposed film units in said first chamber being stacked depthwise of said housing, said first chamber having a light transmitting section aligned with said stacked array of film units through which said film units may be sequentially exposed to actinic radiation and an opening through which said film units may be sequentially advanced from said housing following their exposure, said second chamber having means for defining an access through which a substantially flat battery having terminals may be selectively inserted into said second chamber, to be positioned substantially parallel to each said film unit and in alignment with said stacked array of film units, and subsequently removed therefrom, said second chamber being configured such that the battery terminals are electrically accessible externally of said housing when the battery is positioned within said second chamber;
means of at least initially light sealing said opening of said first chamber, said opening light sealing means being displaceably mounted with respect to said opening to facilitate the advancement of said film units through said opening; and
displaceably mounted means for at least initially light sealing said light transmitting section of said first chamber to preclude premature exposure of said film units.

11. A photographic film assemblage comprising:
a substantially flat housing having means defining a chamber within said housing, a film exit slot, and a battery access aperture;
means positioned within said chamber for partitioning said chamber into a first compartment for receiving film units and a second compartment, light sealed from said first compartment, for receiving a substantially flat battery having terminals, said partitioning means and said housing being further configured to receive the battery through said battery access aperture and position it in said second compartment so that its terminals are externally accessible for electrical connection outside of said housing;
a plurality of substantially flat unexposed film units disposed in a stacked array within said first compartment and positioned therein to be aligned with said film exit slot so that said film units may be sequentially advanced from said first compartment through said film exit slot of said housing; and
means for at least initially light sealing said film exit slot, said film exit slot light sealing means being displaceably mounted with respect to said film exit slot to facilitate the advancement of said film units through said exit slot,
said second compartment being configured so that the battery may be selectively inserted therein to be positioned substantially parallel to each said film unit and in alignment with said stacked array of film units and subsequently removed therefrom, said film exit slot light sealing means and said partitioning means serving to initially light seal said unexposed film units from ambient light so that the battery may be inserted into or removed from said second compartment without exposing said film units.

12. The assemblage of claim 11 wherein said housing further includes means for defining a light transmitting section aligned with said stacked array of film units through which said film units may be exposed to actinic radiation, and wherein said assemblage further includes displaceably mounted means for at least initially covering said light transmitting section to light seal said film units so that said film units are precluded from premature exposure.

13. A photographic film assemblage comprising:
a substantially flat housing formed by a plurality of wall sections interconnected along their peripheral edges to define a chamber within said housing, said chamber having a film exit slot, said wall sections including a front wall section having a light transmitting section and an opposing rear wall section having a battery access aperture, said rear wall section being spaced away from said front wall section to substantially define the depth of said housing;
a platen positioned within said chamber between said front and rear wall sections and overlying said real wall section to partition said chamber depthwise into a first compartment for receiving film units and a second compartment, extending adjacent at least a section of said first compartment and light sealed therefrom, for receiving therein a substantially flat battery having terminals, said platen and said rear wall section being configured so that the battery may be positioned in said second compartment through said battery access aperture such that the battery terminals are exposed through said access aperture;

a plurality of substantially flat unexposed film units disposed in a stacked array depthwise of said first compartment and positioned therein to be aligned with said light transmitting section of said front wall section and said film exit slot so that said film units may be sequentially exposed to actinic radiation through said light transmitting section and subsequently advanced from first compartment through said film exit slot following their exposure;

means positioned inside said chamber between said stacked array of film units and said platen for continuously urging said stacked array of film units toward said light transmitting section and for continuously urging said platen toward said rear wall section;

means for at least initially light sealing said exit slot of said housing, said exit slot light sealing means being displaceably mounted with respect to said exit slot to facilitate the advancement of said film units through said exit slot; and displaceably mounted means for at least initially light sealing said light transmitting section of said front wall section of said housing to preclude premature exposure of said film units;

said second compartment being configured to have the battery selectively inserted therein to be positioned substantially parallel to each film unit and in alignment with said stacked array of film units and subsequently removed therefrom, said platen and said rear wall section of said housing being configured to align the battery in said second compartment such that its terminals are externally accessible for electrical connection through said battery access aperture, all of said aforementioned light sealing means and said platen cooperating to initially protect said unexposed film units so that the battery may be inserted into or removed from said second compartment without prematurely exposing said film units.

14. A film assemblage for holding film for use in a photographic camera, said cassette comprising:

a housing forming a chamber adapted to receive at least one film unit, said housing having a substantially rectangular parallelopiped geometry and including:

opposing front and rear wall sections having planar dimensions L and W which respectively define the major and minor dimensions of said wall sections, said front wall section including means forming a substantially rectangular light transmitting section therein;

opposing side wall sections each connecting said front and rear wall sections along their major lateral edges;

opposing trailing and leading wall sections connecting said front, rear and side wall sections along their respective edges;

first means in said housing for forming a first opening therein to allow passage of a film unit therethrough, said first opening being an elongated slot located adjacent a lateral edge of said leading wall section;

light seal means to prevent light from entering said housing through said first opening therein at least prior to the placement of said cassette into a camera; and second means for releasably attaching an energy source to said housing, said second means being located exterior to said chamber and including a support member extending parallel to said rear wall section and toward said trailing wall section, said support member being spaced from the exterior surface of said rear wall section to form a gap therewith such that the energy source may be inserted into or removed from said gap.

15. A film assemblage for holding an array of stacked, substantially flat film units for use in a photographic camera, said cassette comprising:

a housing forming a chamber adapted to receive the array of film units;

first means in said housing for forming a first opening therein through which the film units may be sequentially advanced from said housing;

light seal means to prevent light from entering said chamber through said first opening in said housing at least prior to the placement of said cassette into a camera; and second means for manually attaching and removing an energy source to said housing, said second mens being located exterior to said chamber and including a support member extending substantially parallel to the array of film units when disposed in said chamber, said support member being spaced away from the exterior surface of said housing to form a gap therewith such that the energy source may be inserted into or removed from said gap.

16. A photographic film assemblage for use in a camera, said assemblage comprising:

a plurality of film units;

a housing having an interior chamber for receiving said film units and adapted to facilitate the successive exposure of said film units, said housing having a substantially rectangular parallelepiped geometry and including:

opposing front and rear wall sections having planar dimensions L and W which respectively define the major and minor dimensions of said wall sections, said front wall section including means for forming a substantially rectangular light transmitting section therein;

opposing side wall sections each connecting said front and rear wall sections along their major lateral edges;

opposing trailing and leading wall sections connecting said front, rear and side wall sections along their respective edges;

first means in said housing for forming a first opening therein to allow passage of a film unit therethrough, said first opening being an elongated slot located adjacent a lateral edge of said leading wall section;

light seal means to prevent light from entering said chamber of said housing through said first opening therein at least prior to the placement of said cassette into a camera;

second means for releasably attaching an energy source to said housing, said second means being located exterior to said chamber and including a support member extending parallel to said rear wall section and toward said trailing wall section, said support member being spaced from the exterior surface of said rear wall section to form a gap therewith such that the energy source may be inserted into or removed from said gap; and an energy source in the form of an electric storage battery adapted to cooperate with said second means for purposes of attaching and removing it from said housing and having means for making suitable electrical contact with a camera to provide the electrical power requirements for the operation of the camera.

17. The assemblage of claim 16 wherein said battery comprises a series of flat thin laminar plates having major and minor dimensions similar to those of said front and rear wall sections, said battery when attached to said housing being disposed within said gap in a plane generally parallel to that containing said front wall section.

18. A photographic film assemblage comprising:

a flat housing having means for defining a chamber interior of said housing and means defining an opening through which a film unit may be advanced to the exterior of said chamber;

a plurality of substantially flat unexposed film units disposed in a stacked array within said chamber;

means for initially light sealing said opening of said housing, said opening light sealing means being displaceably mounted with respect to said opening to facilitate the advancement of said film units through said opening; and means located exterior of said chamber for selectively releasably attaching a substantially flat battery having terminals to said housing, said attaching means being configured to position the battery substantially parallel to each said film unit and in alignment with said stacked array of film units when it is attached to said housing so that its terminals are accessible for electrical connection.

19. The assemblage of claim 18 wherein said housing further includes means for defining a light transmitting section aligned with said stacked array of film units through which said film units may be exposed to actinic radiation and wherein said assemblage further includes displaceably mounted means for at least initially light sealing said light transmitting section to preclude premature exposure of said film units.

20. The assemblage of claim 18 wherein said attaching means is a support member attached to said housing on one of its ends and extending substantially parallel to sid film units, said support member being spaced away from said housing to form a gap therewith to provide a pocket into which the battery may be manually inserted or removed.

21. A photographic film assemblage comprising:

a flat housing formed by a plurality of thin wall sections interconnected along their peripheral edges to define a chamber interior of said housing, said wall sections including a front wall section having a light transmitting section therein through which a film unit may be exposed and a rear wall section oppositely spaced away from said front wall section to substantially define the depth of said housing, said housing further including means defining an opening through which a film unit may be advanced from said chamber;

a plurality of substantially flat unexposed film units disposed in a stacked array within said chamber, said unexposed film units being stacked depthwise of said chamber and extending from a position adjacent said front wall section toward said rear wall section such that said stacked array of film units may be sequentially exposed to actinic radiation passing through said light transmitting section and then sequentially advanced from said chamber following exposure via said opening;

means positioned inside said chamber intermediate said stacked array of film units and said rear wall section for continuously urging said film units towards said light transmitting section;

means for at least initially light sealing said opening of said housing, said opening light sealing means being displaceably mounted with respect to said opening to facilitate the advancement of said film units through said opening;

displaceably mounted means for at least initially light sealing said light transmitting section of said forward wall section of said housing to preclude premature exposure of said film units; and means located exterior of said chamber for selectively releasably attaching a substantially flat battery having terminals to said rear wall section of said housing, said attaching means being configured to position the battery substantially parallel to said rear wall section and in alignment with said array of film units when it is attached to said housing so that its terminals are accessible for electrical connection.

22. The assemblage of claim 21 wherein said attaching means is a flexible support member integrally formed with said housing, said support member being cantilevered from one end of said housing, spaced away from sid rear wall section and extending substantially paralel to said rear wall section so as to define a pocket with said rear wall section into which the battery may be manually inserted or removed without exposing said film units.

23. A photographic film assemblage comprising:

a substantially flat housing including means for defining a chamber interior of said housing and means for defining a depression in said housing, said depression being configured to selectively receive a substantially flat battery having terminals, said depression extending into said chamber, said housing further having an opening through which film units may be sequentially advanced from said chamber;

a plurality of substantially flat unexposed film units disposed in a stacked array within said chamber so that when the battery is disposed within said depression it is positioned substantially parallel to said stacked array of film units;

means for initially light sealing said opening of said housing, said opening light sealing means being displaceably mounted with respect to said opening to facilitate the advancement of said film units through said opening; and means for releasably retaining the battery within said depression so that its terminals are accessible for electrical connection;

said battery retaining means and said depression thus cooperating to provide for the manual attachment or removal of the battery from said housing without prematurely exposing said film units.

24. The assemblage of claim 23 wherein said housing further includes means for defining a light transmitting section aligned with said stacked array of film units through which said film units may be exposed to actinic radiation, and wherein said assemblage further includes displaceably mounted means for at least initially covering said light transmitting section to light seal said film units so that said film units are precluded from premature exposure.

25. A photographic film assemblage comprising:
a substantially flat housing formed of a plurality of thin wall sections interconnected along their peripheral edges to define a chamber interior of said housing, said wall sections including a front wall section having a light transmitting section therein through which a film unit may be exposed and a rear wall section oppositely spaced from said front wall section to substantially define the depth of said housing, said rear wall section having means for defining a depression therein that extends into said chamber toward said front wall section, said housing further including means for defining an opening through which said film units may be advanced from said chamber following their exposure;
a plurality of substantially flat unexposed film units disposed in a stacked array within said chamber, said unexposed film units being stacked depthwise of said chamber and extending from a position adjacent said front wall section toward said rear wall section;
means attached to said rear wall section for partially covering said depression to, in cooperation therewith, form a cavity for selectively releasably receiving a substantially flat battery having terminals so that the terminals are exposed for electrical connection;
means positioned inside said chamber between said stacked array of film units and said rear wall section for continuously urging said stacked array of film units toward said light transmitting section;
means for at least initially light sealing said opening of said housing, said opening light sealing means being displaceably mounted with respect to said opening to facilitate the advancement of said film units through said opening; and
displaceably mounted means for at least initially light sealing said light transmitting section of said front wall section of said housing to preclude premature exposure of said film units.

26. A photographic film assemblage comprising:
a substantially flat integrally molded housing including means for defining a chamber within said housing, said housing including a front wall having a light transmitting section and an opposing rear wall substantially parallel to and spaced away from said front wall to define the depth of said housing, said rear wall having at least one access aperture therein, said housing further including means for partitioning said chamber into a first compartment for receiving film units and a second compartment for releasably receiving a flat battery having terminals, said second compartment extending adjacent at least a section of said first compartment and light sealed therefrom, said first compartment having a film exit slot and said second compartment having an opening through which the battery may be inserted into and removed from said second compartment such that when positioned therein its terminals are accessible for electrical connection through said at least one access aperture of said rear wall;
a plurality of substantially flat unexposed film units disposed in a stacked array within said first compartment and positioned therein to be aligned with said light transmitting section of said front wall and said film exit slot so that said film units may be sequentially exposed to actinic radiation through said light transmitting section and subsequently advanced from said first compartment through said film exit slot;
means positioned inside said housing chamber between said partitioning means and said stacked array of film units for continuously urging said film units toward said light transmitting section;
means for at least initially light sealing said film exit slot of said first compartment, said exit slot light sealing means being displaceably mounted with respect to said exit slot to facilitate the advancement of said film units through said exit slot; and
displaceably mounted means for at least initially light sealing said light transmitting section of said front wall section of said housing to preclude premature exposure of said film units.

27. A film assemblage for use in a photographic camera, said film assemblage comprising:
a housing forming a chamber adapted to receive at least one film unit, said housing having a substantially rectangular parallelepiped geometry and including opposing front and rear wall sections having planar dimensions L and W which respectively define the major and minor dimensions of said wall sections, opposing side wall sections each connecting said front and rear wall sections along their major lateral edges, opposing trailing and leading wall sections connecting said front, rear, and side wall sections along their respective edges, said housing having a first opening therein in the form of an elongated slot defined by an edge of said leading wall section and an edge of said front wall section to allow passage of a film unit therethrough, said front wall section including means for forming a substantially rectangular light transmitting section therein, said rear wall section having means for defining a second opening in said housing for providing access to said chamber for purposes of inserting and removing an energy source therefrom;
a first light seal means to prevent light from entering said housing through said first opening therein at least prior to the placement of said film assemblage into a camera; and
a second light seal means for preventing light from entering said chamber through said second opening and thereby exposing film located within said chamber, said second light seal means in cooperation with said housing forming a cavity adapted to receive the energy source and temporarily retain it in position for use, said energy source cavity being accessible through said second opening of said housing, said second light seal means being a platen-like member located inside said chamber in overlying relation to said rear wall section and having a central portion extending above its lateral edges in a direction toward said front wall section, said central extending portion, in part, defining said energy source cavity.

28. A film assemblage for use in a photographic camera, said film assemblage comprising:

a housing forming a chamber adapted to receive at least one film unit, said housing having a substantially rectangular parallelepiped geometry and including opposing front and rear wall sections having planar dimensions L and W which respectively define the major and minor dimensions of said wall sections, opposing side wall sections each connecting said front and rear wall sections along their major lateral edges, opposing trailing and leading wall sections connecting said front, rear, and side wall sections along their respective edges, said housing having a first opening therein in the form of an elongated slot defined by an edge of said leading wall section and an edge of said front wall section to allow passage of a film unit therethrough, said front wall section including means for forming a substantially rectangular light transmitting section therein, said housing having a second opening for providing access to said chamber for purposes of inserting and removing an energy source therefrom, said second opening being an elongated rectangular slot located adjacent an edge of said rear wall section and an edge of said trailing wall section;

a first light seal means to prevent light from entering said housing through said first opening therein at least prior to the placement of said film assemblage into a camera; and a second light seal means for preventing light from entering said chamber through said second opening and thereby exposing film located within said chamber, said second light seal means in cooperation with said housing forming a cavity adapted to receive the energy source and temporarily retain it in position for use, said energy source cavity being accessible through said second opening of said housing, said second light seal means being a platen like member located inside said chamber in overlying relation to said rear wall section, said platen member, in part, defining said energy source cavity.

29. A photographic film assemblage for use in a camera, said film assemblage comprising:

a plurality of film units;

a housing forming a chamber adapted to receive said film units, said housing having a substantially rectangular parallelepiped geometry and including opposing front and rear wall sections having planar dimensions L and W which respectively define the major and minor dimensions of said wall sections, opposing side wall sections each connecting said front and rear wall sections along their major lateral edges, opposing trailing and leading wall sections connecting said front, rear, and side wall sections along their respective edges, said housing having a first opening therein in the form of an elongated slot defined by an edge of said leading wall section and an edge of said front wall section to allow passage of a film unit therethrough, said front wall section including means for forming a substantially rectangular light transmitting section therein, said rear wall section having means for defining a second opening in said housing for providing access to said chamber for purposes of inserting and removing an energy source therefrom;

a first light seal means to prevent light from entering said housing through said first opening therein at least prior to the placement of said film assemblage into a camera;

a second light seal means for preventing light from entering said chamber through said second opening and thereby exposing film located within said chamber, said second light seal means in cooperation with said housing forming a cavity adapted to receive the energy source and temporarily retain it in position for use, said energy source cavity being accessible through said second opening of said housing, said second light seal means being a platen-like member located inside said chamber in overlying relation to said rear wall section and having a central portion extending above its lateral edges in a direction toward said front wall section, said central extending portion, in part, defining said energy source cavity; and an electric storage battery adapted for insertion and removal from said energy source cavity and having means for making electrical contact with a camera to provide the electrical power requirements for the operation of the camera.

30. The film assemblage of claim 29 wherein said battery comprises a series of flat thin laminar plates having major and minor dimensions similar to those of said front and rear wall sections and lying within said battery cavity in a plane generally parallel to that containing said front wall section.

31. A photographic film assemblage for use in a camera, said film assemblage comprising:

a plurality of film units;

a housing forming a chamber adapted to receive said film units, said housing having a substantially rectangular parallelepiped geometry and including opposing front and rear wall sections having planar dimensions L and W which respectively define the major and minor dimensions of said wall sections, opposing side wall sections each connecting said front and rear wall sections along their major lateral edges, opposing trailing and leading wall sections connecting said front, rear, and side wall sections along their respective edges, said housing having a first opening therein in the form of an elongated slot located adjacent a lateral edge of said front wall section to allow passage of a film unit therethrough, said front wall section including means for forming a substantially rectangular light transmitting section therein, said housing having a second opening for providing access to said chamber for purposes of inserting and removing an energy source therefrom, said second opening being an elongated slot located adjacent a lateral edge connecting said rear wall section and said trailing wall section;

a first light seal means to prevent light from entering said housing through said first opening therein at least prior to the placement of said film assemblage into a camera;

a second light seal means for preventing light from entering said chamber through said second opening and thereby exposing film located within said chamber, said second light seal means in cooperation with said housing forming a cavity adapted to receive the energy source and temporarily retain it in position for use, said energy source cavity being accessible through said second opening of said housing, said second light seal means being a platen-like member located inside said chamber in overlying relation to said rear wall section, said platen-like member, in part, defining said energy source cavity; and an electric storage battery adapted for insertion and removal from said energy source cavity and having means for making electrical contact with a camera to provide the electrical power requirements for the operation of the camera.

* * * * *